Patented Apr. 2, 1929.

1,707,506

UNITED STATES PATENT OFFICE.

HYYM E. BUC, OF ROSELLE, NEW JERSEY, ASSIGNOR TO STANDARD OIL DEVELOPMENT COMPANY, A CORPORATION OF DELAWARE.

PROCESS FOR MANUFACTURE OF OIL-SOLUBLE SULPHONATES.

No Drawing.  Application filed September 26, 1927.  Serial No. 222,214.

This invention relates to the manufacture of oil soluble sodium sulphonates and comprises a process of stabilizing same by the application of heat in an alkaline medium.
When petroleum distillates and particularly lubrilating distillates are treated with fuming sulphuric acid or sulphuric anhydride, certain acids are formed and are found in the oil phase at the expiration of the treatment. These acids are characterized by the presence of sulphur in combination and are predominantly oil soluble. For the purposes of this application they are termed oil soluble sulphonic acids and the metallic derivatives thereof oil soluble sulphonates. These acids are ordinarily neutralized to form oil soluble sodium sulphonate and extracted from the oil phase by the use of a selective solvent such as a mixture of alcohol and water. After the extraction and separation from the oil of the solvent containing dissolved sulphonate, the same is heated to recover the solvent by distillation, leaving a residue of crude oil soluble sodium sulphonate together with some petroleum oil.

In accordance with my method I preferably add to the crude sodium sulphonate so obtained sufficient sodium hydroxide to maintain a concentration therein equivalent to about 3% of the total materials present. Allowance is made for any sodium hydroxide present. Sodium carbonate or other material which will render the medium alkaline may be alternatively employed.

Although 3% is the preferred concentration, more or less may be added provided the crude sulphonate is maintained definitely alkaline throughout. An aqueous solution of sodium hydroxide may be added but the introduction of any large proportion of water would render advisable a reconcentration of the mixture so obtained.

The mixture of sulphonate and caustic is then subjected to a temperature ranging from 150 to 220° C. Time and temperature are reciprocal and I may subject the mixture to a temperature of about 150° C. for a period of several days or to a temperature of about 220° C. for a shorter period, which may range from a few minutes to a few hours. I preferably employ a temperature of about 200° C. and a period of about two hours. Pressure may be applied during this stage of the operation to prevent the complete drying of the material, the retention of some moisture being advisable.

The sulphonate is thereafter further purified by solution in organic solvents such as strong ethyl or isopropyl alcohol, say 75% or higher gravimetric alcoholic concentration, in which inorganic impurities are insoluble. After settling and/or filtration to eliminate inorganic impurities, the solution so obtained is evaporated for the recovery of the solvent and the production of a purified oil soluble sulphonate which may be advantageously employed in making emulsifying oils.

The material so produced, in comparison with material not so prepared is characterized by superior and more uniform resistance to darkening and/or deterioration when exposed to temperatures between 80 and 200° C. for a considerable period. Among other things, the material does not deteriorate when dissolved in solvents and recovered therefrom by the application of heat.

As a specific example, a sample of crude sodium sulphonate was heated to 200° C. for about two hours with 3% of sodium hydroxide. This sample was thereafter dissolved in isopropyl alcohol 88% by weight, settled and the solvent removed by distillation. The material was of a light amber color and 10% thereof, added to a lubricating oil distillate, produced a material with excellent emulsifying properties. The same material when dissolved in isopropyl alcohol, settled and recovered by evaporation of the solvent, without heating in the presence of caustic as above described, was of a dark unattractive color and although quantities ranging from 10 to 15% were added to the same character of lubricating oil, the mixtures produced had very poor emulsifying properties.

It will be understood that the foregoing description is in illustration and not in limitation; among other things, the process may be employed in the manufacture of any sulphonate of the alkali metal group, in which case the heating may be carried out in the presence of a carbonate or hydroxide of the particular member of the alkali metal group chosen. Various alternative procedures may be adopted within the scope of the appended claims in which it is my intention to claim broadly all novelty inherent in the invention.

I claim:

1. The method of improving the sodium salt of an oil soluble sulphonic acid derived from the treatment of petroleum oil with a sulphonating agent, which comprises subjecting the salt to temperatures in excess of 150° C. in an alkaline medium.

2. The method of improving the sodium salt of an oil soluble sulphonic acid derived from the treatment of petroleum oil with concentrated sulphuric acid, which comprises subjecting the salt to temperatures between 150 and 220° C. in an alkaline medium.

3. The process according to claim 2, in which the alkaline medium comprises sodium hydroxide.

4. The method of improving the salt of a member of the alkali metal group with an oil soluble sulphonic acid derived from the treatment of petroleum oil with fuming sulphuric acid or sulphuric anhydride, which comprises subjecting the salt to temperatures between 150 and 220° C. in a medium containing the carbonate or hydroxide of said member.

5. The method of improving the sodium salt of an oil soluble sulphonic acid derived from the treatment of petroleum oil with fuming sulphuric acid, which comprises subjecting the salt to temperatures between 150 and 220° C. in an alkaline medium, thereafter dissolving the same in an organic solvent in which the sulphonate is soluble and in which inorganic materials are difficultly soluble, separating the solution so produced from insoluble materials and evaporating the organic solvent.

6. The method according to claim 5 in which the salt is subjected to a temperature of about 200° F. for about two hours.

HYYM E. BUC.